June 30, 1953 A. W. GUSTAFSON 2,643,796
APPARATUS FOR DISTRIBUTING FERTILIZER OR THE LIKE
Filed May 29, 1950 3 Sheets-Sheet 1
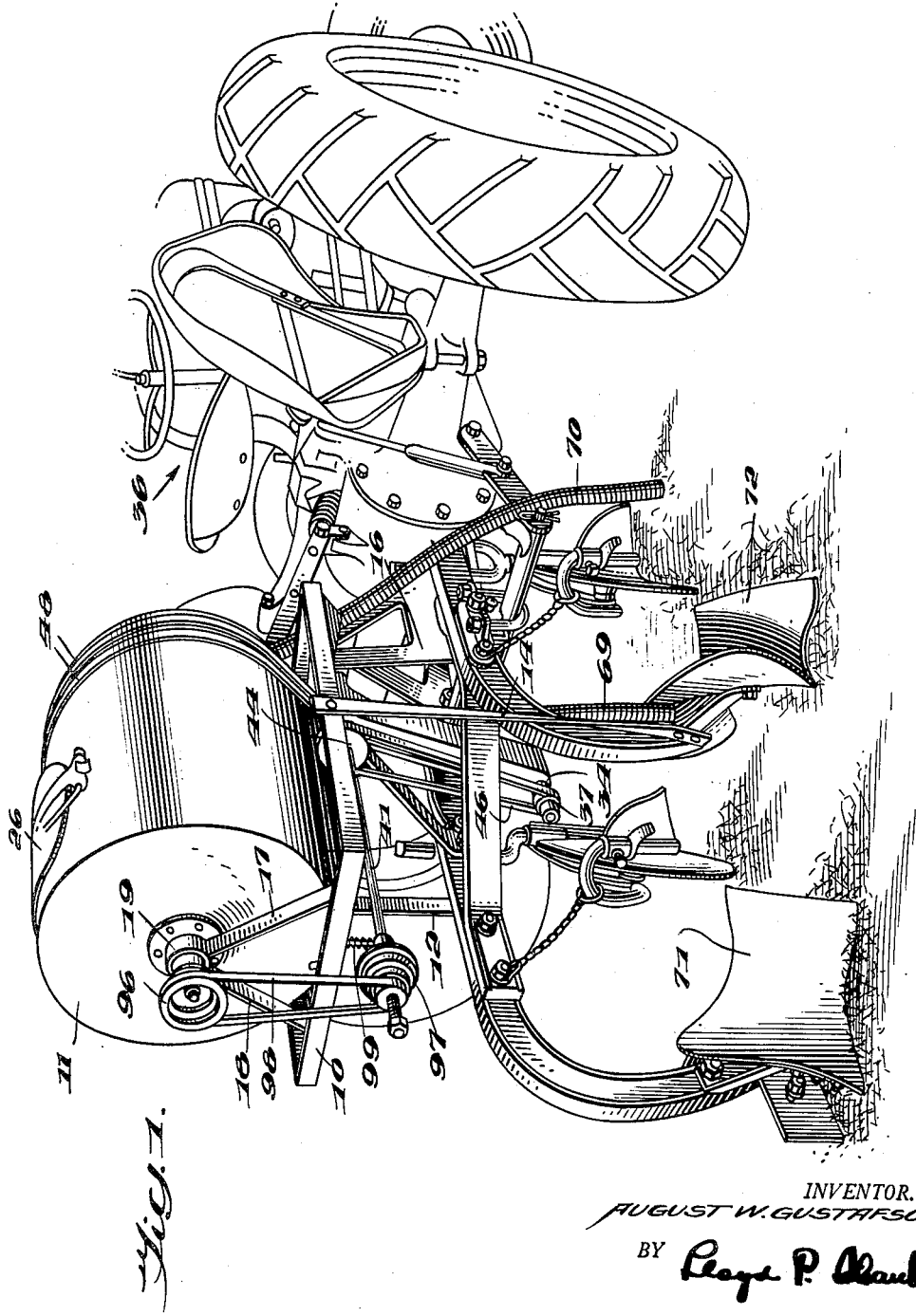
INVENTOR.
AUGUST W. GUSTAFSON,
BY George P. Clark
ATTORNEY June 30, 1953 A. W. GUSTAFSON 2,643,796
APPARATUS FOR DISTRIBUTING FERTILIZER OR THE LIKE
Filed May 29, 1950 3 Sheets-Sheet 2
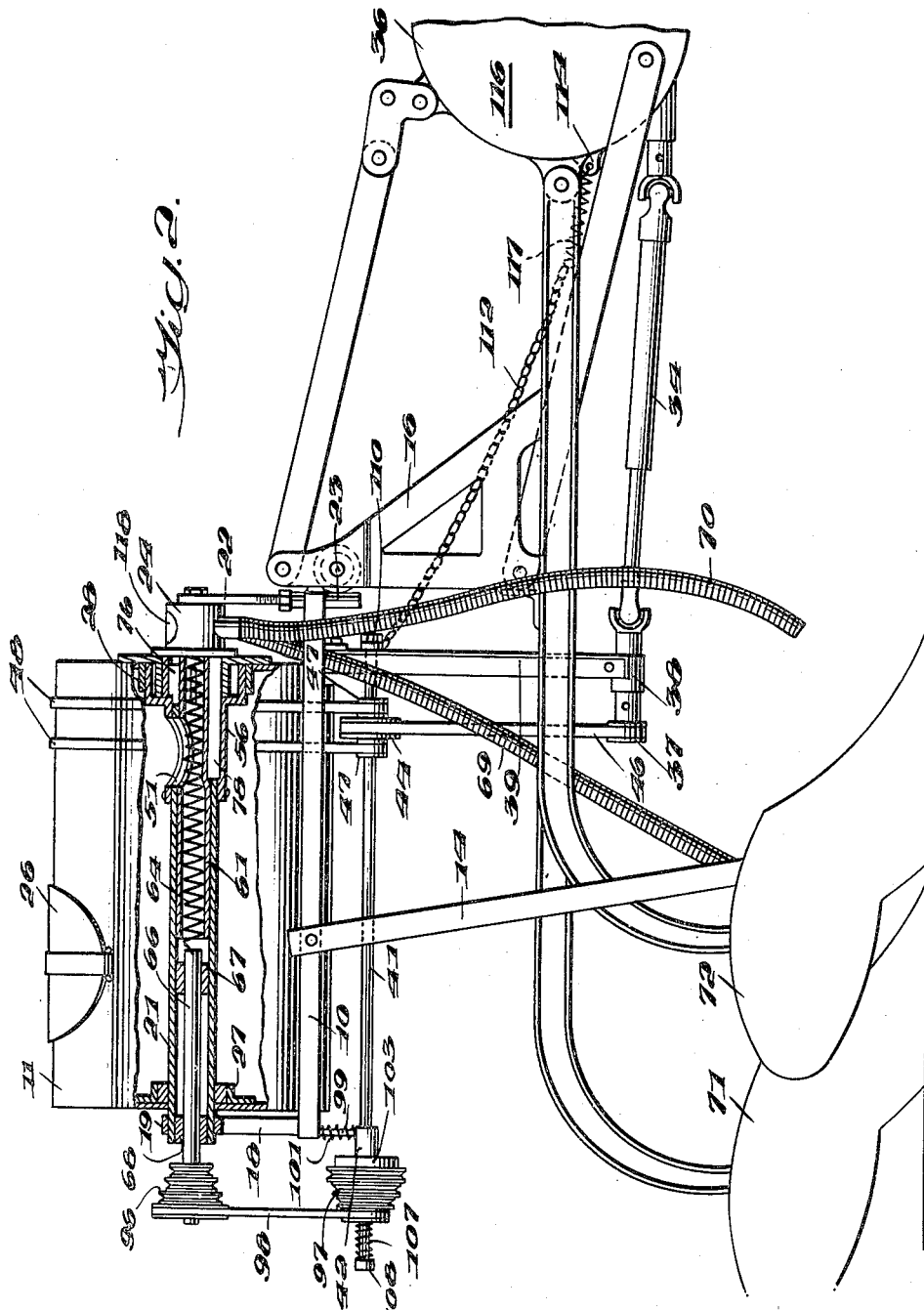
INVENTOR.
AUGUST W. GUSTAFSON,
BY
ATTORNEY June 30, 1953 A. W. GUSTAFSON 2,643,796
APPARATUS FOR DISTRIBUTING FERTILIZER OR THE LIKE
Filed May 29, 1950 3 Sheets-Sheet 3
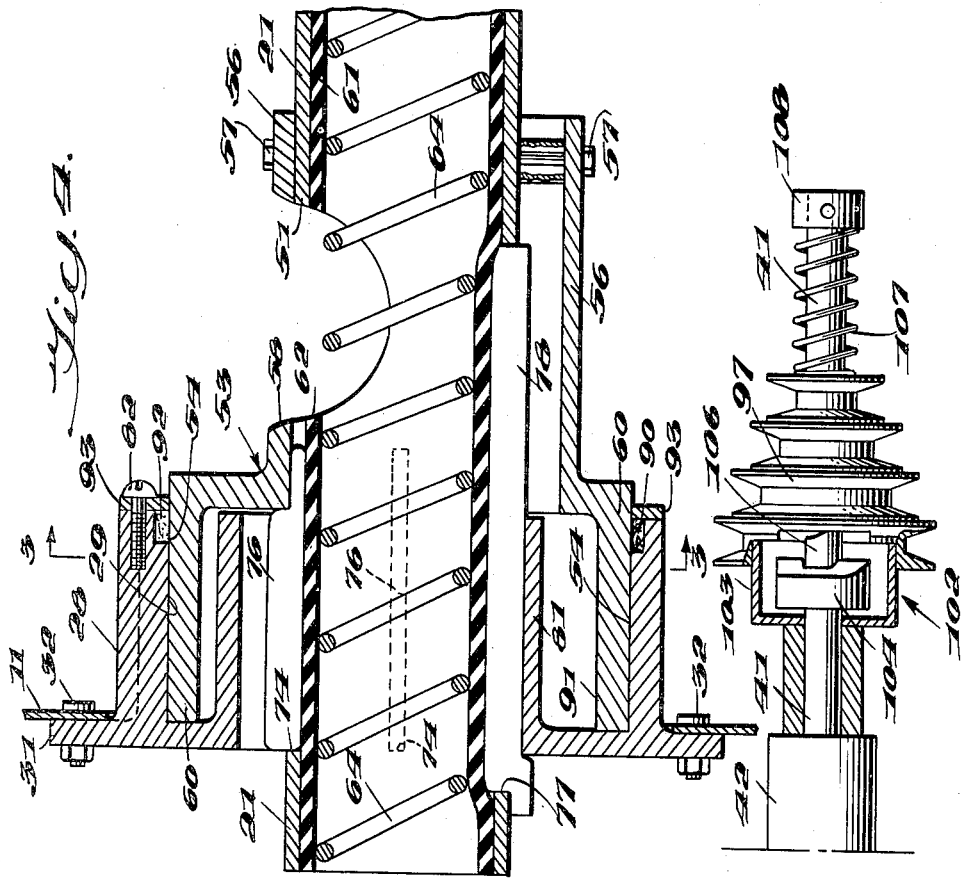
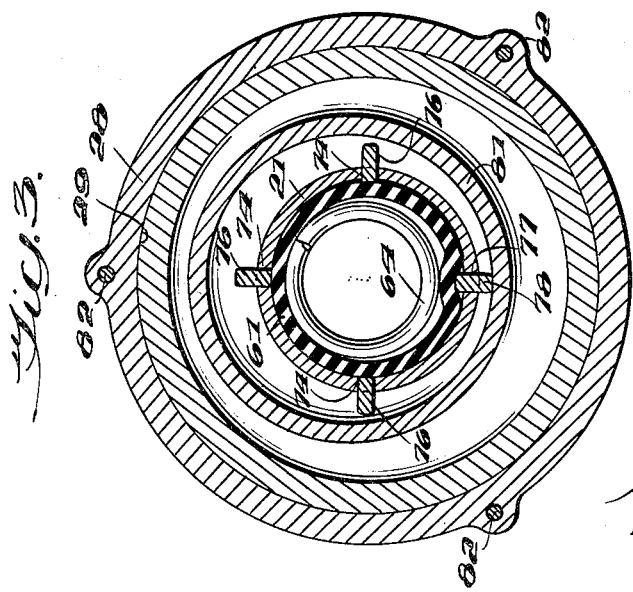
INVENTOR.
AUGUST W. GUSTAFSON,
BY
ATTORNEY Patented June 30, 1953

2,643,796

UNITED STATES PATENT OFFICE 2,643,796

APPARATUS FOR DISTRIBUTING FERTILIZER OR THE LIKE

August W. Gustafson, Corpus Christi, Tex.

Application May 29, 1950, Serial No. 165,092

7 Claims. (Cl. 222—167)

The present invention relates primarily to a machine for introducing fertilizer into the soil as it is being cultivated and more specifically pertains to improvements in a mechanism for moving the fertilizer from a supply hopper or storage drum. The apparatus may also be used for dusting vegetation such as applying a pulverulent insecticide to growing plants.

An object of the invention is to provide a storage drum for pulverized material, such as a fertilizer or an insecticide, with means for positively moving the pulverulent material from the drum and to avoid the possibility of the material clogging the discharge passage from the storage drum or supply hopper.

A more specific object of the invention resides in providing a distortible flexible sleeve within the discharge passage leading from the supply hopper including means for flexing the sleeve so as to break up and dislodge any accumulation of the pulverulent material which may otherwise tend to cake within the discharge passage.

A more detailed object of the invention pertains to the provision of a flexible tube forming a wall of the discharge passage for pulverulent material from a supply hopper including bars which are periodically urged towards the axis of the sleeve to crush any caking or lumps of the fertilizer or insecticide which would otherwise tend to block the discharge passage including a flexible feed member within the rubber tube to effectively move the pulverised material from the storage hopper.

Other objects and features of the invention will be more apparent to those skilled in the art as the present disclosure proceeds and upon consideration of the accompanying drawings and the following detailed description wherein apparatus exhibiting the invention is disclosed.

In the drawings:

Fig. 1 is a perspective view of apparatus embodying the invention.

Fig. 2 is a side elevational view partly in section.

Fig. 3 is an enlarged fragmentary sectional view of the feeding mechanism taken on the line 3—3 of Fig. 4.

Fig. 4 is a fragmentary axial sectional view of a portion of the feed barrel assembly.

Fig. 5 is an enlarged fragmentary view of one of the driving pulleys partly in section and illustrating the clutch mechanism.

The invention is directed to an improved mechanism for discharging pulverized material from a storage drum and the apparatus has particular utility for applying fertilizer to the soil as it is being cultivated. The apparatus is shown in association with a moldboard plow but it will be understood that other types of cultivators may be used and the distributing mechanism has utility in other fields, such as applying insecticides to growing plants or the like.

Referring to the drawings there is shown at 10 a frame which may be of rectangular outline as will be apparent from a consideration of Fig. 1. The frame is horizontally disposed and provides means for supporting a rotatable drum 11 thereon. The frame 10 may be mounted on any type of cultivating mechanism and in the embodiment illustrated the distributing mechanism is supported above a tractor-drawn plow. Any suitable arrangement may be provided for supporting the frame 10 on the plow structure and uprights 12 and 14 may be provided for this purpose. The forward end of the frame 10 may be supported by a bracket structure such as represented at 16.

The rear end of the drum is supported for rotation relative to the frame 10 by upwardly converging frame members 17 and 18. The lower ends of these frame members may be bolted or welded to the frame 10. The upper end of this frame structure carries an annular member 19 which grips the periphery of a feed barrel 21 (Fig. 2) so as to prevent rotation of the tubular feed barrel 21 relative to the frame members 17 and 18. The forward end of the drum 11 is supported so that the drum may rotate about the axes of the feed barrel 21 by means of an upright member 22 which is threaded into a socket member 23 carried by the forward end of the frame 10. The upper end of the upright member 22 is bolted or otherwise secured to a sleeve 24 which covers an end of the feed barrel 21 projecting beyond the forward end of the drum 11. The threaded lower portion of the upright member 22 is for the purpose of raising and lowering the forward end of the drum relative to the frame member 10 and thereby adjusting the tension of the drum driving belts as hereinafter described.

The drum 11 is preferably of cylindrical shape and provides a storage hopper for fertilizer, insecticide or similar pulverized material. An opening is provided in the periphery of the drum 11 which is closed by a door 26. A bearing 27 at the rear end supports this portion of the drum for rotation about the periphery of the feed barrel 21 which remains stationary. The forward end of the drum is provided with a bearing member 28 which has a true cylindrical inner surface 29 arranged concentrically about the axis of the feed barrel 21. This bearing member 28 may be secured to the front end wall of the drum by means of a flange 31 and bolts 32.

The drum 11 is driven by means of belts and pulleys providing a transmission system extending from a power take-off mechanism 34 of the tractor 36. A pulley 37 is provided at the rear end of the power take-off device and this pulley and its shaft may be supported in a fixed position relative to the frame 10 by means of a bearing 38 and a frame one member of which is shown at 39. A shaft 41 is mounted for rotation below the drum 11 in suitable bearings one of which is shown at 42. The front bearing (not shown) is of the sleeve friction type and may be supported by the depending frame members 39. A pulley 44 is secured to the shaft 41. A belt 46 is trained about the pulley 37 and the pulley 44 so as to provide an arrangement for transmitting rotation from the power take-off mechanism 34 to the shaft 41. A pair of pulleys 47 of smaller diameter than the pulley 44 are secured to the shaft 41 on opposite sides of the pulley 44. A pair of belts 48 are trained about the periphery of the drum 11 and the pulleys 47. This belt and pulley arrangement provide means for rotating the drum 11 about the axis of the stationary feed barrel 21.

The fertilizer or insecticide material within the drum 11 is agitated while the drum 11 rotates. The drum may be provided with baffle-like scoops (not shown) to facilitate the mixing and agitating of the pulverized material as the drum rotates. A feature of the invention pertains to means for removing the pulverized material from the drum. The feed barrel 21 is tubular shaped and may be formed of metal so as to be substantially rigid and extend axially along the drum and beyond the ends thereof, as shown in Fig. 2. A relatively large hole 51 is provided in the feed barrel 21 adjacent the forward end of the drum. A bearing member 53 having a cylindrical outer surface 54 concentric about the axis of the feed barrel 21 is journalled in the bearing 28 as best shown in Fig. 4. This bearing member 53 carries a sleeve portion 56 which is secured to the periphery of the feed barrel 21 by means of cap screws 57 or the like. The sleeve portion 56 is provided with an aperture 58 radially aligned with the opening 51 in the feed barrel.

The feeding mechanism includes a flexible tube or sleeve 61 which may be formed of rubber or a like flexible resilient material. This flexible sleeve 61 fits snugly within the feed barrel 21 and extends along the length thereof to a position as shown in Fig. 2. An inlet opening 62 is provided in the rubber sleeve matching the opening 51 in the feed barrel 21. These openings are directed upwardly so that the pulverized materials within the drum may drop through the aperture in the feed barrel assembly and enter the sleeve 61.

An open helical member 64 is provided within the flexible sleeve 61 and this member resembles a helical spring and extends along the feed barrel assembly and is coupled to a driving shaft 66 (Fig. 2). This shaft is journalled for rotation in bearings 67 and 68 provided within the stationary feed barrel 21. Thus upon rotation of the open helical shaped member 64 the pulverized material within the sleeve 61 is moved towards the front end of the drum 11 and into the sleeve 24. This pulverized material may drop by gravity in flexible tubes 69 and 70. These tubes have their lower ends positioned in the rear of the moldboards 71 and 72 so that the fertilizer may be deposited in the furrows as being provided by the plow or cultivator. Only one of the tubes 69 is shown in the proper position in the drawings to facilitate illustration of other parts of the apparatus.

The feeding mechanism includes means for breaking up any cakes of the pulverized material which may tend to block the passage within the sleeve 61. The feed barrel 21 is provided with three slots 74 circumferentially spaced from each other by approximately ninety degrees as shown in Fig. 3. A bar 76 is provided in each of the slots 74 and these bars are radially disposed as shown in Figs. 3 and 4. A longer slot 77 is provided in the lower portion of the feed barrel 21 and arranged substantially in the six o'clock position. A bar 78 of greater length than the bars 76 is mounted in the slot 77. The bearing member 28 carries a cylindrical flange 81 which is eccentrically arranged with respect to the axis of the feed barrel 21. In other words, the center of the cylindrical flange 81 is displaced from the axis of the feed barrel so that upon rotation of the drum 11 and the bearing member 28, the drum revolves about the axis of the feed barrel 21 but the flange 81 moves in an orbital path so as to progressively engage the bars 76 and 78. These bars are moved inward in their associated slots in a manner as illustrated in Fig. 3 where the bar 78 has been moved radially inward to distort the rubber sleeve 61. This inward distortion of the sleeve 61 is made possible by the helical and flexible characteristics of the feed screw member 64. The resilient features of the sleeve 61 and the helical member 64 return the bars to their out positions after the eccentric flange 81 retreats from the bars. Such periodic inward distortion of the flexible sleeve 61 breaks up any cakes of the pulverized material to prevent obstruction of the discharge passage and to insure a steady discharge of the fertilizer or insecticide from the hopper.

The periphery of the cylindrical flange 69 of the bearing member 53 may be sealed with reference to the bearing member 28 by means of packing 90 arranged in a channel 92 and maintained in this position by a ring member 93. A plurality of screws 82 hold the ring 93 in position.

A pulley 96 is secured to the rear end of the shaft 66. This pulley may be of a step-down type and a similar pulley 97 is mounted on the rear end of the shaft 41 and arranged in a reversed manner with respect to the pulley 96. A belt 98 is trained about the pulleys 96 and 97. The bearing 42 supporting the shaft 41 is connected to the frame 10 by means of a pin 99 which is movable vertically relative to the frame 10 but prevents movement of the bearing 42 axially of the shaft 41. A spring 101 urges the bearing 42 downwardly to maintain tension on the belt 98. The belts 48 are maintained under tension by raising the upright member 22 at the forward end of the drum.

The pulley 97 is not rigidly attached to the shaft 41 but is free to move axially thereon and adapted to be connected to the shaft 41 by a clutch mechanism shown generally at 102 in Fig. 5. A cup-shaped member 103 is mounted for free rotation on the shaft 41 and this cup-shaped member provides a housing enclosing the clutch parts. The open end of the cup-shaped member 103 extends into a recess formed in the larger end of the pulley 97 and abuts against the pulley 97. A clutch dog 104 is rigidly secured to the shaft 41. Another clutch dog 106 is mounted for free rotation relative to the shaft 41 and is carried by the pulley 97. The pulley 97 is free to move axially on the shaft 41 and is biased towards the clutch engaging position by means of a spring 107 which surrounds the free end of the shaft 41. A collar 108 is provided as an abutment for the spring 107 which urges the pulley 97 to the left in Fig. 5 and to the right in Fig. 2. When the clutch parts are in the engaged positions power is transmitted to the shaft 66 for driving the helical feed member 64.

The apparatus includes means for arresting driving of the feed screw 64 when the cultivator or plow is raised to an inoperative position. It is for this purpose that the shaft 41 is slidable axially in its bearings. A collar 110 is so attached to the forward end of the shaft 41 to permit rotation of this shaft without driving the collar 110. A flexible connection is provided from the collar 110 to a fixed part of the tractor. Such a flexible connection may take the form of a chain 112 connected to a bracket 114 on the power take-off housing 116. A spring 117 is interposed in this flexible connection and the spring 117 is so designed as to have a less tendency to be distorted than the spring 107. Thus when the plow or the cultivating device is raised the shaft 41 will be pulled forwardly against the action of the spring 107 to disengage the clutch dogs 104 and 106 since the cup member abutting against the bearing 42 prevents axial movement of the pulley 97. While the shaft 41 continues to rotate the pulley 97 is no longer driven and further driving of the helical feed member 64 is thereby arrested. Accordingly, the fertilizer or insecticide is not distributed through the discharge tubes 69 and 70 when the cultivator or plow is in the raised position. When the feeding mechanism again moves downwardly as the cultivator or plow is lowered to a cultivating position the shaft 41 will retreat rearwardly with respect to the frame 10 in response to the force of the spring 107. The clutch parts 104 and 106 will then re-engage to transmit power to the shaft 66 whereby the feeding of the fertilizer or insecticide will be resumed. It is to be noted that only a small amount of axial movement of the shaft 41 is required to provide engagement and disengagement of the clutch parts and such movement does not disturb the alignment of the pulleys about which the belts 48 are trained.

The operation of the device will be apparent and it is to be noted that the sleeve 24 may be provided with an inspection aperture 118 so that the operator of the tractor 36 may readily determine if a fertilizer or pulverulent material is being removed from the drum 11. The rate of discharge may also be adjusted by altering the position of the belt 98 on the pulleys 96 and 97. While the invention has been described with reference to specific structural details and with regard to one organization, it will be understood that a number of drums may be mounted on a cultivating device so as to provide a greater source of fertilizer for distribution to the various cultivating elements. Such changes and others may be made without departing from the spirit and scope of the invention as set forth in the appended claims.

What I claim and desire to secure by Letters Patent is:

1. In apparatus for discharging pulverulent material, a rotatable drum, a stationary feed barrel within and extending along the axis of the drum, a flexible sleeve within said barrel, said barrel and sleeve having an aperture therein through which the pulverulent material may pass to the interior of the sleeve, means for distorting said sleeve inwardly, and a flexible feed member within the sleeve for moving the pulverulent material axially within the sleeve.

2. In apparatus for discharging fertilizer, a rotatable drum, a stationary feed barrel supported within the drum and extending along the axis of the drum, a flexible sleeve within said barrel, said barrel and sleeve each having an aperture therein through which the fertilizer may pass to the interior of the sleeve, bars carried by the barrel adjacent the exterior of the sleeve, means for moving said bars inwardly to distort said sleeve inwardly, and a flexible feed screw within the sleeve for moving the fertilizer axially within the sleeve.

3. In apparatus for feeding pulverized material, a stationary feed barrel having an opening in the periphery thereof, a drum rotatable about said feed barrel, said barrel having a plurality of circumferentially spaced slots therein, a bar mounted for radial movement in each of said slots, a rubber sleeve within said barrel having an opening aligned with the opening in said barrel, an eccentric member moved with the drum engaging said bars for moving them inwardly to distort the sleeve, and flexible means within the sleeve for moving said bars radially outwardly and moving the pulverized material axially in the sleeve.

4. In apparatus for feeding pulverulent material, a stationary feed barrel having an opening in the periphery thereof, a drum rotatable about said feed barrel, said barrel having a plurality of circumferentially spaced slots therein, an elongated bar mounted for radial movement in each of said slots, a rubber sleeve within said barrel having an opening therein radially aligned with the opening in said barrel, an eccentric member carried by the drum intermittently engaging said bars for moving them inwardly to distort the sleeve, and an open flexible helical member within the sleeve.

5. In apparatus for feeding pulverulent material, a stationary feed barrel having an opening in the periphery thereof, a drum rotatable about said feed barrel, said barrel having a plurality of circumferentially spaced slots therein, an elongated bar mounted for radial movement in each of said slots, a rubber sleeve within said barrel having an opening therein radially aligned with the opening in said barrel, an eccentric member carried by the drum engaging said bars for moving them inwardly to distort the sleeve, an open flexible helical member within the sleeve, a stationary sleeve receiving the pulverulent material from the rubber sleeve, and at least one flexible tube in communication with the stationary sleeve extending downwardly therefrom.

6. In apparatus for feeding pulverulent material, a stationary feed barrel having an opening in the periphery thereof, a drum mounted for rotation about said feed barrel, said barrel having a plurality of circumferentially spaced slots therein, an axially disposed bar arranged in each of said slots for radial movement relative to the feed barrel, a rubber sleeve within said feed barrel having an opening therein radially aligned with the opening in the feed barrel, an eccentric flange mounted on the drum to rotate therewith and embracing said bars for progressively moving each of the bars radially inward to distort the rubber sleeve, an open helical member within the sleeve, and means for rotating said helical member to move the pulverulent material through the sleeve.

7. In apparatus for feeding pulverulent material, a stationary feed barrel having an opening in the periphery thereof, a hopper rotatable about said feed barrel, said barrel having a plurality of circumferentially spaced slots therein, a bar mounted for radial movement in each of said slots, a flexible sleeve within said barrel having an opening therein registering with the opening in the barrel, a member carried by the drum periodically engaging each of said bars for moving them inwardly to distort the sleeve, and a flexible and resilient feed member within the sleeve for moving the pulverulent material axially within the sleeve and for urging said bars outwardly.

AUGUST W. GUSTAFSON.

References Cited in the file of this patent

UNITED STATES PATENTS

| Number | Name | Date |
|---|---|---|
| 425,733 | Bingham | Apr. 15, 1890 |
| 801,627 | Wunsch | Oct. 10, 1905 |
| 1,655,753 | Cole | Jan. 10, 1928 |
| 1,722,849 | Luse | July 30, 1929 |
| 2,318,392 | Hipple | May 4, 1943 |
| 2,339,689 | Englund | Jan. 18, 1944 |